United States Patent [19]

Boon et al.

[11] Patent Number: 4,833,371
[45] Date of Patent: May 23, 1989

[54] PICTURE DISPLAY DEVICE WITH SYMMETRICAL DEFLECTION

[75] Inventors: Cornelis A. M. Boon, The Hague; Arnoldus J. J. Boudewijns; Adrianus J. Frensch, both of Eindhoven, all of Netherlands

[73] Assignee: U.S. Philips Corporation, New York, N.Y.

[21] Appl. No.: 197,541

[22] Filed: May 23, 1988

[30] Foreign Application Priority Data

Jun. 3, 1987 [NL] Netherlands ............... 8701292

[51] Int. Cl.$^4$ .................. H01J 29/70; H01J 29/76
[52] U.S. Cl. ...................... 315/403; 315/399; 358/158
[58] Field of Search ............ 315/408, 399, 403; 358/148, 158

[56] References Cited

U.S. PATENT DOCUMENTS 4,660,080  4/1987  Dietz et al. ............... 358/158

Primary Examiner—Theodore M. Blum
Attorney, Agent, or Firm—Edward W. Goodman

[57] ABSTRACT

A picture display device for displaying a picture by means of a line raster consisting of a plurality of lines which are successively scanned in the opposite direction includes a video signal processing circuit for receiving an incoming video signal comprising video information and synchronizing signals and for supplying the video information of a line in one direction and the video information of the subsequent line in the opposite direction, and a line deflection circuit for generating a line deflection current through a line deflection coil. To minimize the power which is dissipated in the line deflection circuit, this circuit constitutes a self-oscillating stage with its natural frequency which is determined by a resonant network comprising the line deflection coil and which is independent of the frequency of the line synchronizing signal in the incoming video signal.

13 Claims, 5 Drawing Sheets

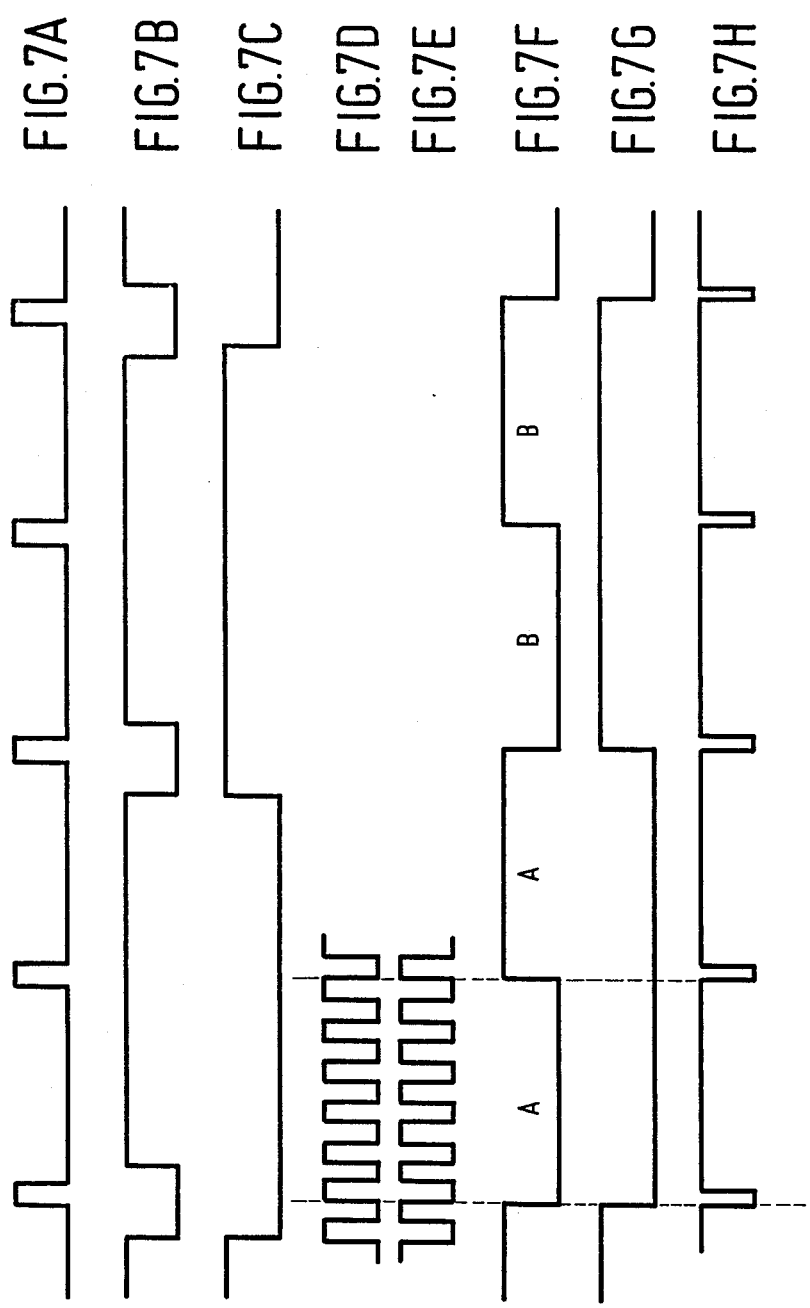

PICTURE DISPLAY DEVICE WITH SYMMETRICAL DEFLECTION

BACKGROUND OF THE INVENTION

The invention relates to a picture display device for displaying a picture by means of a line raster consisting of a plurality of lines which are successively scanned in the opposite direction, said device comprising a video signal processing circuit for receiving an incoming video signal comprising video information and synchronising signals and for supplying the video information of a line in one direction and the video information of the subsequent line in the opposite direction, and a line deflection circuit for generating a line deflection current through a line deflection coil which forms part of a resonant network for obtaining the said scanning.

A picture display device of this type is known from European Patent Application No. 175,409 (PHN 11 432). Advantages of the symmetrical line deflection described in this Application are the low dissipation power of the line deflection circuit and the low voltage load of the different elements of this circuit. The line deflection current has the frequency and the variation which are determined by the input signal of the amplifier supplying this current, which signal originates from a line synchronising circuit and is synchronised with the line synchronising signal present in the incoming video signal. A further essential reduction of the dissipation is obtained because the line deflection coil is incorporated in a resonant circuit whose tuning frequency is equal to half the line frequency, i.e. the frequency of the line synchronising signal, whilst the line deflection current flowing through the coil also has half the line frequency. However, in practice it has been found that the exact tuning is not achieved and that variations of the resonance frequency occur, for example, owing to tolerances, temperature effects or by ageing or replacement of components. Moreover, the incoming line frequency may vary, for example, when the incoming video signal originates from a video recorder. As a result of these effects a larger dissipation is required to maintain the correct amplitude of the line deflection current than in the case where the resonance frequency is always equal to half the incoming line frequency. This problem is known: the German publication "Neues aus der Technik", no. 4 of 15, Nov. 1985, page 4, proposes to control the tuning frequency of the resonant circuit by providing a controllable inductive element as part of the said circuit. However, such an element is expensive and it dissipates energy.

SUMMARY OF THE INVENTION

An object of the invention is also to minimise the dissipation power, but without any additional inductive elements. According to the invention a picture display device of the type described above is therefor characterized in that the line deflection circuit constitutes a self-oscillating stage with its natural frequency which is determined by the resonant network comprising the line deflection coil and which is independent of the frequency of the line synchronising signal in the incoming video signal.

Since the line deflection circuit is free running, its natural frequency may vary for all kinds of reasons, for example, as a result of variations of the tuning frequency of the resonant network. However, this has no consequence at all for the dissipation which always remains minimum, because the line deflection current undergoes the same frequency variation. A possible variation of the frequency of the incoming line synchronising signal neither has any influence on the dissipation. Since the frequency chosen for the line deflection can vary, it will be evident that it may under circumstances become temporarily equal to the incoming line frequency. It may be noted that decoupling of the frequency of the line deflection from the incoming line frequency is a measure which is known per se. For example, in European Patent Application No. 109,099 (PHN 10 449) a circuit is described for converting the field frequency in which a generator for the purpose of the line deflection is not synchronised. However, it is not a symmetrical line deflection, no special choice being made for the deflection frequency and the line deflection coil being no part of a resonant network determining this frequency.

The picture display device is preferably characterized in that the frequency of the line deflection circuit is at least equal to the frequency of the line synchronising signal in the incoming video signal. This provides a greater freedom in the choice of the frequency of the line deflection, as will be apparent hereinafter.

In one embodiment, in which the picture display device includes a controllable oscillator for generating a signal for the line deflection, the device is characterized by a control for generating a control signal for controlling the frequency of the oscillator at the value which is determined by the resonant network.

A picture display device, in which the video signal processing circuit is provided with a read memory for reading the video information and with a clock oscillator for generating a clock signal for reading from the memory, is advantageously characterized in that the frequency of the clock signal is determined by the resonant network including the line deflection coil and in that a control unit for generating control signals for the purpose of reading from the read memory includes a counter for applying an address signal to the memory, the frequency of the clock signal of the counter being coupled to the frequency of the line deflection circuit.

Reading from the memory is effected in a satisfactory manner if the conrol unit comprises means for generating a signal to determine the instant of commencement of reading from the memorie and for resetting the counter, which signal is synchronised with a signal originating from the line deflection circuit.

BRIEF DESCRIPTION OF THE DRAWING

The invention will now be described in greater detail by way of example with reference to the accompanying drawings in which FIG. 7 shows some waveforms which are generated in these control units.

DETAILED DESCRIPTION OF THE INVENTION

Figure 1:
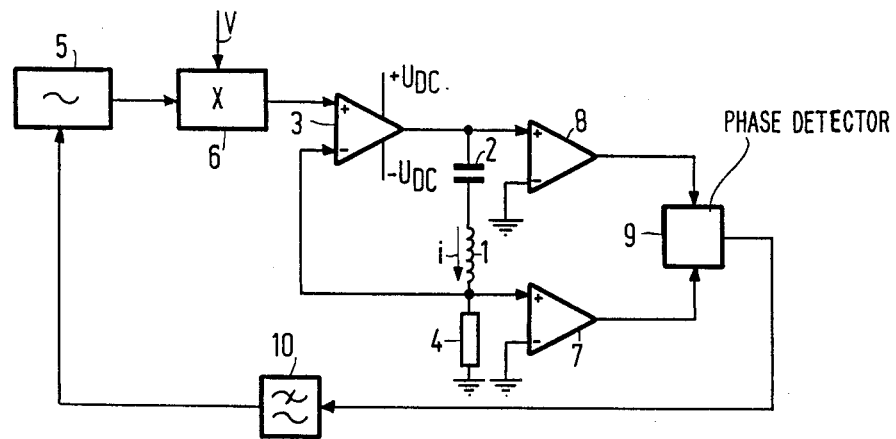
FIG. 1 shows a circuit diagram of the line deflection circuit of a picture display device according to the invention.

In FIG. 1 the reference numeral 1 denotes a line deflection coil which is arranged in series with a capacitor 2. The series arrangement formed is connected to an output terminal of a power amplifier 3. A negative feedback resistor 4 whose other end is connected to ground is arranged in series with elements 1 and 2. The junction point of elements 1, 2 and 4 is connected, possibly via a feedback network, to an inverting input terminal of amplifier 3 a non-inverting input terminal of which receives a control signal. Capacitor 2 ensures a DC separation between amplifier 3 and coil 1. In addition elements 1 and 2 constitute a series resonant circuit. A sinusoidal line deflection current i which is supplied by amplifier 3 and which has substantially the same variation as the control signal of the amplifier flows through this circuit.

Amplifier 3 is, for example, a class AB power amplifier. It has to supply comparatively little power, namely the power which is dissipated in the ohmic resistance of coil 1 and in resistor 4. Due to the high quality factor of capacitor 2 there is substantially no dissipation in this capacitor. During one half of the period of current i this current flows in the direction shown in FIG. 1, that is to say, from amplifier 3 to coil 1 and during the subsequent half of the period the current flows back to the amplifier 3 in the opposite direction. On the display screen of a picture display tube not shown in FIG. 1 horizontal lines are scanned in the opposite direction by the electron beam(s) generated therein.

If the condition is satisfied that the resonance frequency of circuit 1, 2 is equal to the frequency of current i, the voltage at the output of amplifier 3 has its lowest value. This voltage is equal to the voltage drop across the series arrangement of resistor 4 and the ohmic resistance of coil 1. If amplifier 3 operates in its linear range, the total DC power required for the line deflection is given by the formula $P_{DC} = 2U_{DC}I_{DC}$ in which $P_{DC}$ is the said power, $U_{DC}$ and $-U_{DC}$ are the supply voltages of amplifier 3 and $I_{DC}$ is the DC current derived therefrom. At a sinusoidal output current voltage $U_{DC}$ is equal to the peak amplitude of the sinusoidal output voltage of the amplifier.

Out of resonance the output voltage of the amplifier is higher than in resonance, namely by a factor which is substantially equal to $2Q \Delta f/f_o$. At a current $I_{DC}$ which has remained the same the power $P_{DC}$ is to be multiplied by the same factor. Here Q is the quality factor of the resonant circuit, $f_o$ is the resonance frequency and $\Delta f$ is the difference between the frequency of current i and frequency $f_o$. If the control signal of amplifier 3 is synchronised with the line frequency of the incoming video signal and if this frequency varies, then the frequency of current i also varies. Such a variation may occur when the incoming video signal originates from a video recorder in which a deviation of 300 Hz with respect to the nominal line frequency $f_H$ of 15.625 kHz (European television standard) is possible. If current i has the frequency of the incoming signal, in which 31,250 lines per second are scanned and if the resonant circuit is tuned to 15.625 kHz, then it appears at an inductance of coil 1 of approximately 1.5 mH and a value of resistor 4 of approximately 0.2Ω that 2.5 times as much DC power is dissipated than in the case of resonance in which case approximately 8.8 W is dissipated in the circuit and 0.7 W is dissipated in resistor 4 for a deflection current with a peak amplitude of 2.66 A, whilst $P_{DC} = 12$ W. Even without variation of the incoming line frequency a deviation with respect to the resonance may be produced due to tolerances, because both the inductance of coil 1 and the capacitance of capacitor 2 are specified with a tolerance of 5%. The resonance frequency may therefore deviate by 780 Hz from the nominal line frequency so that 6 times as much power is dissipated than in the case of resonance.

In the circuit of FIG. 1 the line deflection is not synchronised with the incoming line frequency, but the line deflection frequency is determined by the resonance frequency of the resonant circuit constituted by coil 1 and capacitor 2. If the resonance frequency varies for one reason or other, for example due to tolerances, temperature effects or ageing or replacement of components, then the frequency of current i follows this variation. Consequently the power which is dissipated in the line deflection circuit is minimum under all circumstances and is independent of the line frequency presented to the input.

The control signal of amplifier 3 is generated by a voltage-controlled sine oscillator 5 and it is applied to the amplifier via a modulator 6 in which multiplication by a field frequency signal is effected for the purpose of correcting the east-west raster distortion. The voltage which is present at the junction point of the series resonant circuit 1, 2 and the negative feedback resistor 4 is applied to a non-inverting input terminal of an amplifier 7 which operates as a comparison stage an inverting input terminal of which is connected to a reference voltage, for example the ground potential. When current i passes the value of zero, a pulse edge is present at an output terminal of amplifier 7. The time position of this edge is not influenced by the east-west modulation. Similarly, the voltage present at the junction point of the output terminal of amplifier 3 and circuit 1, 2 is applied to a non-inverting input terminal of an amplifier 8 an inverting input terminal of which is connected to a reference voltage, for example the ground potential. Each pulsatory voltage at the outputs of amplifiers 7 and 8 is applied to an input of a phase detector 9.

The measuring voltage across resistor 4 and the voltage across the resonant circuit 1, 2 are compared by means of phase detector 9. A signal is supplied from an output of detector 9, which signal is dependent on the phase difference between these voltages and which is substantially proportional to said difference. This signal is smoothed by means of a low-pass filter 10 and the smoothed signal is applied to oscillator 5 for its control. If detector 9 measures a phase difference, oscillator 5 is controlled until the difference has become substantially zero. There is no longer substantially any phase difference between the voltage across the resonant circuit constituted by coil 1 and capacitor 2 and the current flowing therethrough, and the frequency of oscillator 5 is substantially equal to the resonance frequency $f_o$ of the circuit. This frequency is independent of the line frequency $f_H$ of the incoming video signal and will generally deviate therefrom. In the relevant embodiment a resonance frequency $f_o$ has been chosen which, while taking the tolerances into account, is certainly higher than the deflection frequency in the case of synchronous operation. If a deviation of 300 Hz due to a signal generated by a video recorder is taken into account, then it holds that $f_o$ is higher than or equal to 15.925 kHz. If coil 1 has an inductance of 1.5 mH and if the maximum tolerance for coil 1 and capacitor 2 is approximately 5%, a capacitance is found for the capacitor which is smaller than or equal to approximately 60 nF.

Figure 2:
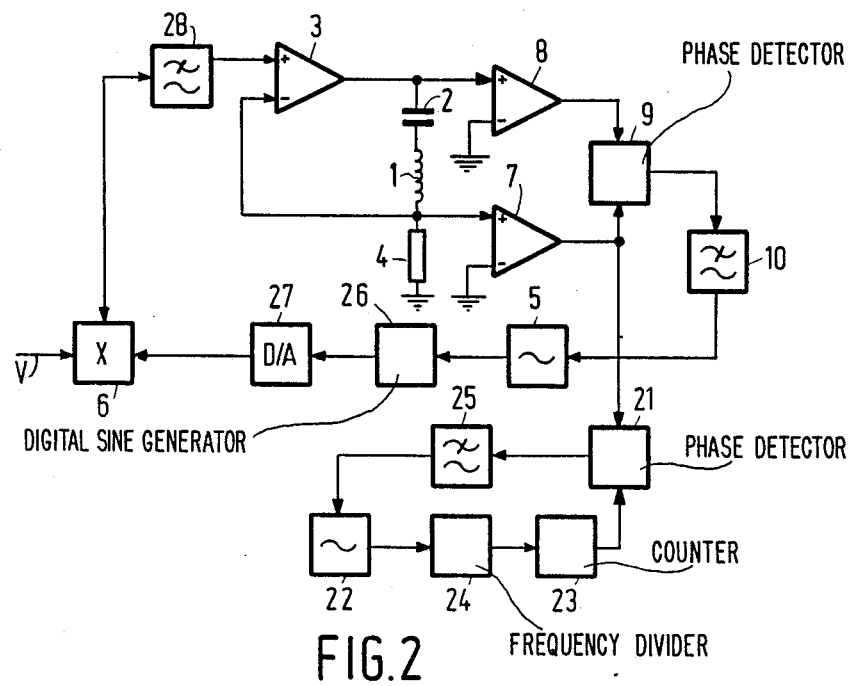
FIG. 2 shows a more complete diagram of the circuit of FIG. 1.

The requirements imposed on oscillator 5 are fairly strict as far as phase stability, harmonic distortion and tunability are concerned. In FIG. 2, in which the same components of the circuit as those in FIG. 1 have the same reference numerals, a circuit is shown which better meets these requirements. Oscillator 5 has a much higher frequency of approximately 2 MHz than frequency $f_o$. The clock signal generated by oscillator 5 is applied to a digital sine generator 26. In the steady state of the control loop for controlling oscillator 5 the output signal of generator 26 corresponds to 128 samples for one period of a sine waveform at the frequency $f_o$. The sine form is obtained by means of a digital-to-analog converter 27 and it is applied to modulator 6. A second low-pass filter 28 is arranged between modulator 6 and amplifier 3 for eliminating the clock signal and a small remaining harmonic distortion caused by converter 27 and modulator 6.

The picture display device of which the described circuits form part comprises a video signal processing circuit for processing the video information which is present in the incoming video signal. For this purpose this circuit comprises memories for successively writing the video information in the sequence of arrival and for reading the stored video information in such a manner that the information read is displayed on the one line from left to right on the display screen and on the subsequent line from right to left. To ensure that the video information is displayed in the correct location on the screen, the picture display device includes a second phase control loop with a second phase detector 21 which receives the signal at the output of amplifier 7, and a clock oscillator 22. Oscillator 22 generates a clock signal for the read memory with its frequency in the steady state of the control loop being a multiple of the frequency of the line deflection circuit. This signal is applied directly or via a frequency divider 24 to a counter 23 which counts the clock pulses until half the number of picture elements of a line has been read from the read memory. At that instant a pulse edge is applied to detector 21, if necessary via a compensating delay element. The output signal of detector 21, which is a measure of the phase difference between the input signals of the detector, is applied to a low-pass filter 25 and the control signal smoothed thereby is applied to oscillator 22 for its control. It is apparent therefrom that the read clock frequency is locked with the line deflection frequency. If the frequency of the signal of oscillator 5 is accurate enough, which frequency is also determined by the zero-crossing detector 7 and by the control loop, the oscillator may operate as a read clock oscillator, whilst oscillator 22 is dispensed with. The deflection circuit with the parts 1 to 6 and the above-mentioned second control loop have been described in greater detail in European Patent Application No. 175,409 (PHN 11.432) in the name of the Applicant, which is herein incorporated by reference.

It will be evident that the circuits described with reference to FIGS. 1 and 2 may have different forms. For example, the series resonant circuit comprising the line deflection coil may be replaced by a parallel resonant circuit. In the case of resonance the current through and the voltage across the circuit are in phase. The line deflection section may be formed without a separate oscillator and output stage, but as a self-oscillating output stage. The oscillator described in the non-prepublished Netherlands Patent Application No. 8602263 (PHN 11 859) is very suitable for this purpose. In the case of self-oscillating stage the natural frequency of the stage may be free running and a control of the frequency, as is the case in FIG. 1 with the aid of elements 9 and 10 is dispensed with. Also in the case described of an oscillator controlled by means of a control loop the entire deflection section can be considered as a self-oscillating circuit which has its own natural free running frequency. In both cases the natural frequency is determined by the resonant network.

Figure 3:
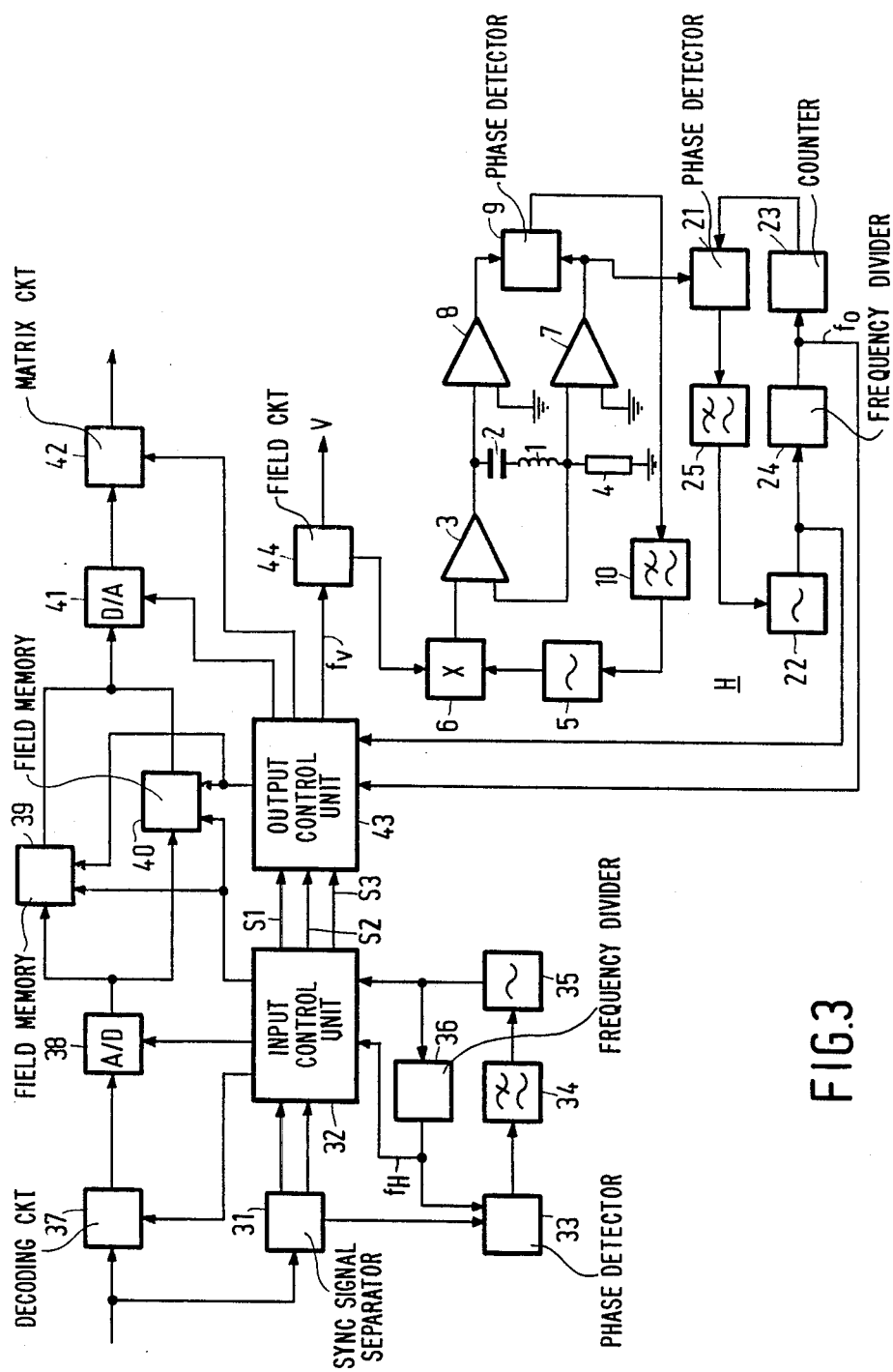
FIG. 3 shows a circuit diagram of the line deflection circuit and the video signal processing circuit of the picture display device.

The picture display device, whose line deflection section as well as the read clock generation are described in FIG. 2, also includes a synchronising circuit for processing the synchronising signal which is present in the incoming video signal. This circuit and also the aforementioned video signal processing circuit are shown in FIG. 3. A field synchronising signal, a field recognition signal and a line synchronising signal are obtained in known manner from the incoming signal by means of a synchronising signal separator 31, the first two signals being applied to an input control unit 32 and the third signal being applied to a phase detector 33. Detector 33 forms part of an input phase control loop of known type including an oscillator 35. The signal of the oscillator, whose frequency in the steady state of the loop is a multiple of the nominal line frequency $f_H$ of the incoming signal, is applied to a frequency divider 36. The phase of the signal of divider 36, which at an average has the same frequency as the incoming line synchronising signal, is compared by means of detector 33 with that of the said incoming signal. The output signal of detector 33 is smoothed by a low-pass filter 34 for controlling oscillator 35. The signal of oscillator 35 and the signal of divider 36 are applied to the control unit 32.

The incoming video signal is also applied to a decoding circuit 37. A luminance signal and colour difference signals are present at the output of said circuit. They are converted into digital signals by means of an analog-to-digital converter 38. The signals obtained are applied to a first and a second field memory 39 and 40, respectively. By means of these memories the fields present in the incoming signals and succeeding each other in the sequence ABAB ... at the frequency $f_V=50$ Hz (European television standard) are converted into fields of the sequence AABBAABB ... at the double frequency of 100 Hz. Here A and B denote the two types of fields which form a picture upon interlaced display. A type A field is stored in memory 39 and in the same period two type B fields come from memory 40. The colour signals of these two fields are obtained for the picture display tube via a digital-to-analog converter 41 and a matrix circuit 42. During the subsequent field period a field B is written in memory 40 whilst the field A just stored in memory 39 is read at the double rate so that two fields A are applied to converter 41. During reading the sequence of the video information is inverted every other line. If under the influence of the line deflection field the spot of the electron beam moves from left to right on the display screen, the video information comes from a memory in the same sequence as in the sequence in which it entered the memory. If the spot moves from right to left during the subsequent line period, the video information comes from the memory in the inverted sequence with respect to the sequence of arrival. Control signals which are required by elements 37, 38, 39 and 40 at the input side, inter alia, the write clock signals for the memories, are coupled to the incoming line frequency and are generated by the input control unit 32. Control signals which are required by elements 39, 40, 41 and 42 at the output side, inter alia, the read clock signals for the memories, are coupled to the line deflection frequency and are generated by an output control unit 43. In FIG. 3 the output section H described with reference to FIGS. 1 and 2 is shown in a simplified manner. The signals generated by means of oscillator 22 and divider 24 are applied to unit 43. This unit also generates a field frequency signal which is applied to a field circuit 44 for the purpose of the vertical deflection V. The signal for the east-west correction which is applied to modulator 6 also originates from circuit 44.

Figure 4:
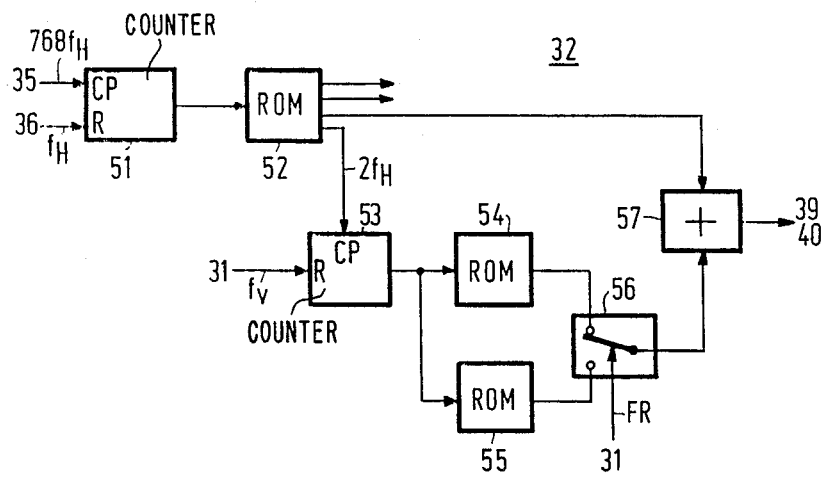
FIGS. 4, 5 and 6 show parts of control units which form part of the video signal processing circuit of FIG. 3.

The section of the control unit 32 in which the control signals for writing the video information are generated is shown in FIG. 4. A counter 51 receives the signal of oscillator 35 as a clock signal and the signal of the frequency divider 36 as a reset signal. In the steady state of the input control loop the last-mentioned signal has the line frequency $f_H$, i.e. 15.625 kHz nominally, whilst the frequency of the first-mentioned signal is a multiple thereof, for example, by a factor of 768, i.e. 12 MHz nominally. Counter 51 counts from 0 to 767 samples per line. The output signal of counter 51 goes to a read-only memory 52 in which control signals for the different parts of the picture display device are stored, which signals have the sampling frequency or frequencies derived therefrom. One of these signals has the frequency $2f_H$ and is applied as a clock signal to a counter 53 which receives the incoming field synchronising signals as a reset signal. Counter 53 counts from 0 to 624 half lines per field to be written. The output signal of counter 53 is applied to a read-only memory 54 an output of which is connected to a selection contact of a selector switch 56 and to a read-only memory 55 an output of which is connected to a second selection contact of switch 56. This switch is operated by the field recognition signal FR which originates from separator 31 so that line-frequency signals alternately relating to the one or the other of the two fields together constituting the picture are present at the master contact of switch 56. This master contact is connected to an input of an adder stage 57. Another input of stage 57 is connected to an output of memory 52 at which a line-frequency control signal is present which increases linearly during the active part of a line to be written. The output of stage 57 is connected to the two field memories 39 and 40 for determining the addressing for writing the video information in these memories with both the part of the memory addresses indicating the location of a sampling in a line and the part of the memory addresses indicating the memory starting location of a line. The incoming signals may be suitable for interlaced display. For this reason not the lines but half the lines are counted by means of counter 53. Counter 53 may form part of a more extensive field synchronising circuit for synchronising the signal applied to field circuit 44 in known manner with the incoming field synchronising signal, which field synchronising circuit is sufficiently insensitive to interference.

Figure 5:
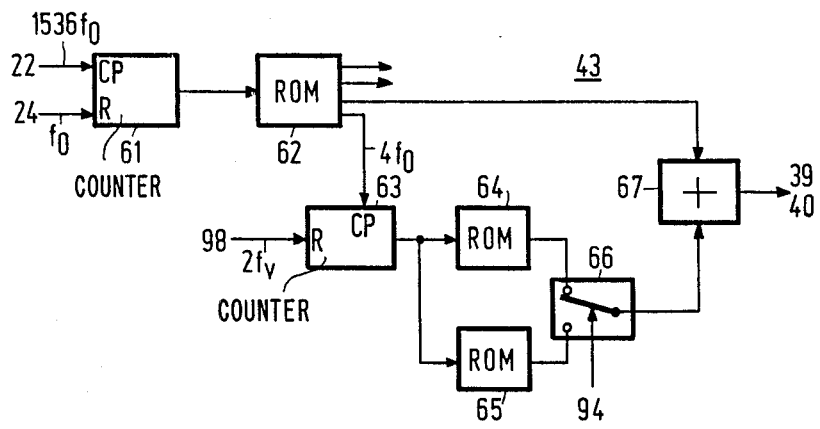

The part of the control unit 43 in which the control signals for reading the video information are generated is shown in FIG. 5. A counter 61 receives the signal of oscillator 22 as a clock signal and the signal of the frequency divider 24 as a reset signal. In the steady state of the control loop, with which parts 22 and 24 are associated, the frequency of the last-mentioned signal is the frequency $f_o$ of the line deflection, i.e. 15.925 kHz nominally, whilst the frequency of the first-mentioned signal is a multiple thereof, for example by a factor of $768 \times 2 = 1536$, i.e. 24.4608 MHz nominally. Counter 61 counts from 0 to 1535 samples per period of the line deflection current, i.e. a period in which two successive lines are written on the display screen. The output signal of counter 61 goes to a read-only memory 62 in which control signals are stored. One of these signals has the frequency $4f_o$ and is applied as a clock signal to a counter 63 which receives a signal of double the incoming field frequency as a reset signal whose generation will be described hereinafter. Counter 63 counts from 0 to 624 half lines per field to be read. The output signal of counter 63 is applied to a read-only memory 64 an output of which is connected to a selection contact of a selector switch 66 and to a read-only memory 65 an output of which is connected to a second selection contact of switch 66. This switch is operated by a field recognition signal which determines the type of field A or B which is displayed and whose generation will be described hereinafter. Signals at the deflection frequency relating to the one or the other of the two fields together constituting a picture to be displayed are present at the master contact of switch 66. This master contact is connected to an input of an adder stage 67. Another input of stage 67 is connected to an output memory 62 at which a control signal is present at the frequency $f_o$ which signal linearly increases during the active part of a line to be written on the display screen, i.e. a line which is displayed from left to right, and which decreases linearly during the active part of the line to be subsequently written, i.e. a line displayed from right to left. The output stage 67 is connected to both field memories 39 and 40 for determining the addressing for reading the video information from these memories with both the part of the memory addresses indicating the sampling location in a line and the part of the memory addresses indicating the memory starting location of a line. Memories 39 and 40 also receive a same picture frequency control signal, i.e. at half the incoming field frequency, to ensure that one memory is written while the other is read.

Figure 6:
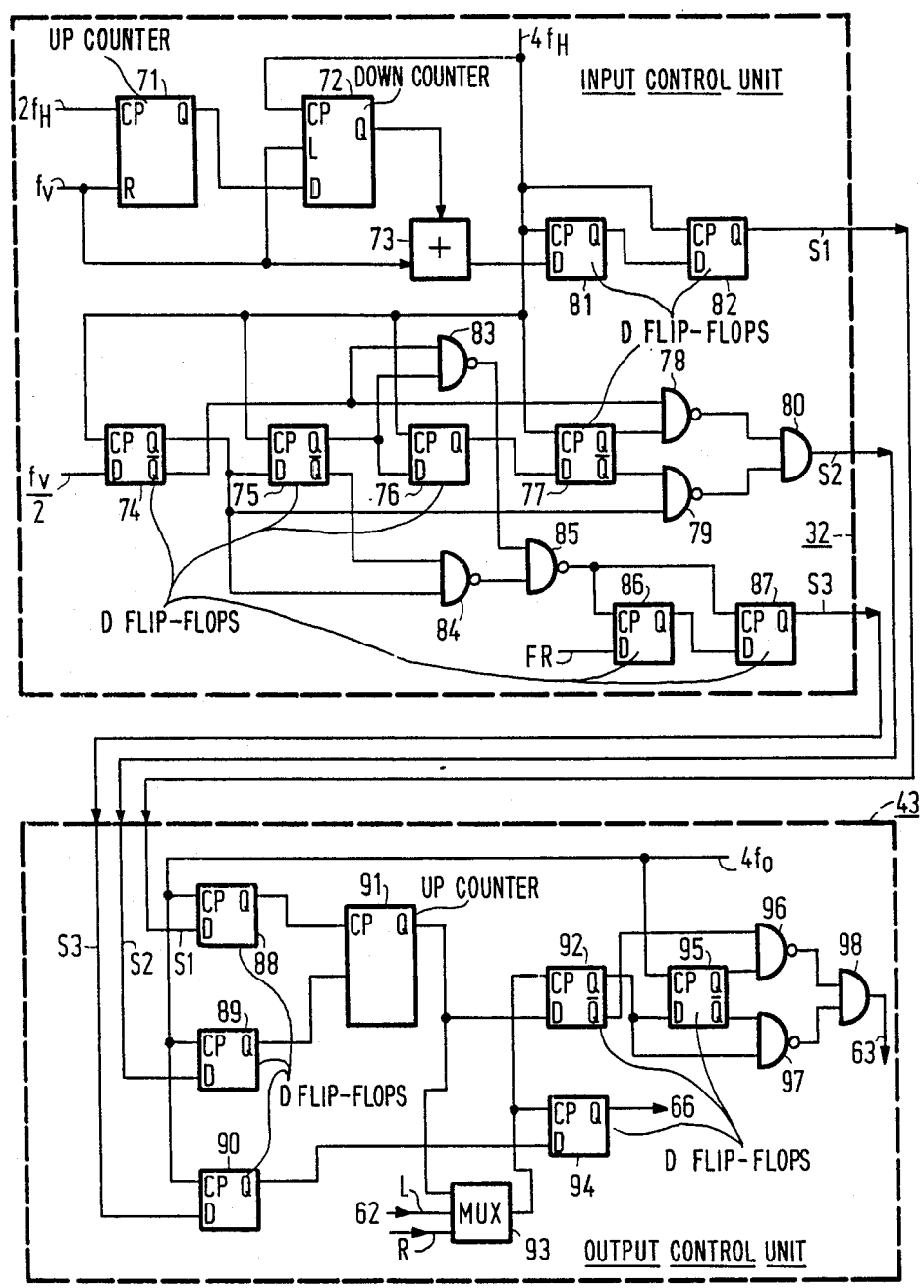

It is apparent from the foregoing that reading the video information stored in a field memory stops after 312.5 lines have been scanned on the display screen. This is the entire video information of one incoming field. Since the read clock, which runs asynchronously with respect to the write clock, has a higher frequency than this write clock, more than twice as many lines are processed in a given period during reading than during writing. One field in the output section is thus sooner processed than half a field in the input section. The output section catches up with the input section. The circuit of FIG. 6 ensures that reading and writing cannot be effected simultaneously in a field memory.

An up-counter 71 in the input control unit 32 counts clock pulses at the frequency $2f_H$ which originate from the input control loop and is each time reset by a signal at the field frequency $f_V$. Counter 71 thus counts the number of half lines in an incoming field. This number is taken over by a down counter 72 at a start of a new field. Counter 72 counts down to 0 at a clock of the frequency $4f_H$ and supplies a pulse halfway the incoming field. This pulse and the field frequency pulse are added by means of an adder stage 73. The output signal of stage 73 comprises pulses at the frequency $2f_V$. Unit 32 also comprises f our D-type flip-flops 74, 75, 76 and 77 which are arranged in cascade and which receive the signal at the frequency $4f_H$ as a clock signal. A signal of half the field frequency is applied to the D preparatory input of the first flip-flop 74. The signals at the inverting output $\overline{Q}$ of flip-flop 74 and at the non-inverting output Q of flip-flop 77 are combined in a first NAND gate 78 and the signals at the non-inverting output Q of flip-flop 74 and at the inverting output $\overline{Q}$ of flip-flop 77 are combined in a second NAND gate 79. Two inputs of an AND gate 80 are each connected to outputs of gates 78 and 79, respectively. The signal S2 at an output of gate 80 has the field frequency, whilst the duration of the pulses in this signal is equal to 4 periods of the clock signal, i.e. one line period of the incoming video signal and in which a leading edge in signal S2 occurs a short time after a leading edge in the signal at the frequency $f_V/2$. For compensating the delay caused by the flip-flops, the output signal of stage 73 is applied for two D-type flip-flips 81 and 82 arranged in cascade so that a signal S1 is produced.

The signals at the output $\overline{Q}$ of flip-flop 74 and at the output Q of flip-flop 75 are combined in a NAND gate 83 and the signals at the output Q of flip-flop 74 and at the output $\overline{Q}$ of flip-flop 75 are combined in another NAND gate 84. Two inputs of a further NAND gate 85 are each connected to outputs of gates 83 and 84, respectively. The pulses at an output of gate 85 also have field frequency, whilst the duration of each pulse is equal to one period of the clock signal and the leading edge of each pulse coincides with that of a pulse of signal S2. The signal obtained by means of gate 85 is applied as a clock signal to two further D-type flip-flops 86 and 87 which are arranged in cascade, whilst the field recognition signal FR is applied to the D preparatory input of flipflop 86. A field frequency signal S3, which has a delay of approximately one field period, with respect to the identification signal, is present at the output of the flip-flop 87.

The output control unit 43 has three D-type flip-flops 88, 89 and 90 which receive as a clock signal a signal having four times the frequency $f_o$ of the line deflection section. Signal S1 is applied to the D preparatory input of flip-flop 88, signal S2 is applied to the D preparatory input of flip-flop 89 and signal S3 is applied to the D preparatory input of flip-flop 90. The three input signals are generated by means of signals which are synchronised at the line frequency $f_H$ of the incoming video signal. On the other hand the output of signals of flip-flops 88, 89 and 90 are synchronized at the frequency $f_o$ of the deflection section. The start of a field to be read is determined by signal S1 and the start of the first line in the said field is determined by the clock signal. The output signal of flip-flop 88 is applied as a clock signal to an up-counter 91. The output signal of flip-flop 89 is applied to a charge enable input of counter 91. Counter 91 is reset at the start of each incoming field. The fields of the output section are counted thereby. Due to the longer duration of the pulses in signal S2 a shift of one and/or both edges with respect to signal S1 has no consequence for the instant at which the field counter 91 is set to zero, which instant is determined by the last-mentioned signal. Since the output clock is asynchronous with the two signals, it may in fact happen that the rising or falling edges of the signals at the outputs of flip-flops 88 and 89 are shifted with respect to each other over one period of the output clock, namely if the rising or falling edge coincides with the rising edge of the clock. Such a shift can be caused by noise and/or interferences.

The signal at an output Q of counter 91 is applied to the D preparatory input of a D-type flip-flop 92 and to an input of a multiplex circuit 93. A signal L of the frequency $f_o$ is applied to a second input of circuit 93 and a signal R likewise of the frequency $f_o$ is applied to a third input of circuit 93. The output signal of circuit 93 is applied as a clock signal to flip-flop 92 and to a further D-type flip-flop 94 whose D preparatory input is connected to an output of flip-flop 90. Both signals L and R originate from memory 62 and they have a symmetrical square shape with the opposite polarity. Dependent on the value at the output Q of counter 91 either signal L or signal R is present at the output of circuit 93. The non-inverting output Q of flip-flop 92 is connected to the D preparatory input of a further D-type flip-flop 95 which receives the signal of the frequency $4f_o$ as a clock signal. The signals at the inverting output $\overline{Q}$ of flip-flop 92 and at the non-inverting output Q of flip-flop 95 are combined in a first NAND gate 96 and the signals at the non-inverting output Q of flip-flop 92 and at the inverting output $\overline{Q}$ of flip-flop 95 are combined in a second NAND gate 97. Two inputs of an AND gate 98 are each connected to outputs of gates 96 and 97, respectively. The signal at an output of gate 98 comprises pulses having the double value of the incoming field frequency and it is applied to counter 63 for resetting this counter. With each pulse a field to be read is initiated and since and edge of each pulse coincides with an edge of the signal L or R, reading starts each time at the start of a line period. Circuit 93 ensures that reading of the video information of a field starts at the instant when the spot of the electron beam on the display screen is in the top left corner of the screen (signal L for a line from left to right) and that reading of the video information of the subsequent field starts at the instant when the spot is in the top right corner of the screen (signal R for a line from right to left). It has been found that this choice leads to fewer visible interferences.

The signal at an output of flip-flop 94 is a symmetrical square-wave signal at half the incoming video frequency. The edges of this signal occur each time at the start of a line period. It is applied as a field recognition signal to switch 66 for determining the type of field which is displayed.

FIG. 7 shows some waveforms which have been verbally described hereinbefore. FIG. 7a shows the signal S1, FIG. 7b shows the signal S2 and FIG. 7c shows the signal S3. FIGS. 7d and 7e show the signals L and R for which it is assumed for the sake of simplicity that there is a lower line number per field than is actually the case. FIGS. 7f, g and h show the output signals of elements 91, 94 and 98, respectively. An advantage of the synchronising circuit described is the fact that the synchronising instant, i.e. the starting instant for reading, is each time determined by one signal only, namely the signal at the output of flip-flop 88.

An embodiment of the parts of a picture display device which are important for the invention has been described hereinbefore. It will be evident that those skilled in the art are capable of conceiving variants within the scope of this invention. For example, the measure according to the invention may be used for a symmetrical line deflection which is not sinusoidal but triangular. The doubling of the field frequency used in the described embodiment is in itself an advantageous measure, but it will also be evident that the invention need not be limited thereto. The same applies to the choice made for the line deflection frequency, namely higher than the incoming line frequency. Since reading from the memory is effected at a slower rate than writing at a line deflection frequency which is lower than the incoming line frequency, reading must then be effected during the field blanking intervals of the incoming video signal because in these intervals video information is not written. A certain limit value is determined for the deflection frequency in this case. It will therefore be clear that $f_o \geqq f_H$ is to be preferred. It will also be noted that the circuit according to the invention, which is suitable for the display of a standard video signal, is alternately suitable for non-standard signals.

What is claimed is:

1. A picture display device for displaying a picture by means of a line raster consisting of a plurality of lines which are successively scanned in the opposite direction, said device comprising a video signal processing circuit for receiving an incoming video signal comprising video information and synchronising signals and for supplying the video information of a line in one direction and the video information of the subsequent line in the opposite direction, and a line deflection circuit for generating a line deflecting current through a line deflection coil which forms part of a resonant network for obtaining the said scanning, characterized in that the line deflection circuit constitutes a self-oscillating stage with its natural frequency which is determined by the resonant network comprising the line deflection coil and which is independent of the frequency of the line synchronising signal in the incoming video signal.

2. A picture display device as claimed in claim 1, characterized in that the frequency of the line deflection circuit is at least equal to the frequency of the line synchronising signal in the incoming video signal.

3. A picture display device as claimed in claim 1, including a controllable oscillator for generating a signal for the line deflection, characterized by a control for generating a control signal for controlling the frequency of the oscillator at the value which is determined by the resonant network.

4. A picture display device as claimed in claim 3, characterized by a phase comparison stage for comparing the phase of the current through the resonant network with respect to the voltage across the said network and for generating the control signal for the oscillator.

5. A picture display device as claimed in claim 3, characterized in that the frequency of the signal of the oscillator is many times higher than the resonance frequency of the resonant network, the signal of the oscillator being a sampling signal for a sine generator for generating the line deflection current.

6. A picture display device as claimed in claim 1, in which the video signal processing circuit is provided with a read memory for reading the video information and with a clock oscillator for generating a clock signal for reading, from the memory, characterized in that the frequency of the clock signal is determined by the resonant network including the line deflection coil.

7. A picture display device as claimed in claim 3 characterized in that the oscillator for the line deflection is also operative as a read clock oscillator.

8. A picture display device as claimed in claim 6, characterized in that a control unit for generating control signals for the purpose of reading from the read memory includes a counter for applying an address signal to the memory, the frequency of the clock signal of the counter being coupled to the frequency of the line deflection circuit.

9. A picture display as claimed in claim 8, characterized in that the maximum counting position of the counter corresponds to the number of lines in an incoming field.

10. A picture display device as claimed in claim 8, characterized in that the control unit comprises means for generating a signal to determine the instant of commencement of reading from the memory and for resetting the counter, which signal is synchronised with a signal originating from the line deflection circuit.

11. A picture display device as claimed in claim 10, characterized in that reading of the video information of a field starts at the instant when the spot on a display screen is present in the top left corner of the screen and in that reading of the video information of the subsequent field starts at the instant when the spot is present in the top right corner of the screen.

12. A picture display device as claimed in claim 8, characterized in that the control unit comprises means for generating a field recognition signal for passing the address signal to the read memory to determine the field to be displayed in an interlaced picture, said field recognition signal being synchronised with a signal originating from the line deflection circuit.

13. A picture display as claimed in claim 6, characterized in that the oscillator for the line deflection is also operative as a read clock oscillator.

* * * * *